United States Patent [19]

Copeland et al.

[11] Patent Number: 5,878,428
[45] Date of Patent: *Mar. 2, 1999

[54] SYSTEM, METHOD, AND ARTICLE OF MANUFACTURE FOR ADDING TRANSACTIONAL RECOVERY TO A BINARY CLASS IN AN OBJECT ORIENTED SYSTEM

[75] Inventors: George Prentice Copeland, Austin, Tex.; Simon Antony James Holdsworth, Andover, England; Stanley Alan Smith, Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 559,856

[22] Filed: Nov. 20, 1995

[51] Int. Cl.$^6$ ...................................................... G06F 17/30
[52] U.S. Cl. ........................... 707/103; 707/202; 707/204
[58] Field of Search .................................... 395/614, 609, 395/182.18, 700, 182.13, 601, 13; 707/204, 103, 202; 364/200

[56] References Cited

U.S. PATENT DOCUMENTS

| | | | |
|---|---|---|---|
| 4,525,780 | 6/1985 | Bratt et al. ............................. | 364/200 |
| 4,814,971 | 3/1989 | Thatte .................................... | 364/200 |
| 4,853,842 | 8/1989 | Thatte et al. ........................... | 364/200 |
| 4,912,708 | 3/1990 | Wendt .................................. | 371/16.3 |
| 4,945,474 | 7/1990 | Elliot et al. ............................ | 364/200 |
| 4,949,251 | 8/1990 | Griffin et al. ........................... | 395/609 |
| 4,979,105 | 12/1990 | Daly et al. ............................. | 364/200 |
| 4,989,132 | 1/1991 | Mellender et al. ..................... | 364/200 |
| 4,993,015 | 2/1991 | Fite, Jr. ................................... | 370/16 |
| 4,999,829 | 3/1991 | Fite, Jr. et al. .......................... | 370/16 |
| 5,008,786 | 4/1991 | Thatte .................................... | 364/200 |
| 5,016,162 | 5/1991 | Epstein et al. .......................... | 364/200 |
| 5,016,243 | 5/1991 | Fite, Jr. ................................... | 370/16 |
| 5,043,871 | 8/1991 | Nishigaki et al. ....................... | 364/200 |
| 5,075,845 | 12/1991 | Lai et al. ................................ | 395/425 |
| 5,093,914 | 3/1992 | Coplien et al. ......................... | 395/700 |
| 5,095,480 | 3/1992 | Fenner ................................... | 370/94.1 |
| 5,111,413 | 5/1992 | Lazansky et al. ...................... | 364/578 |
| 5,136,712 | 8/1992 | Perazzoli, Jr. et al. ................. | 395/700 |
| 5,163,148 | 11/1992 | Walls ..................................... | 707/204 |
| 5,185,885 | 2/1993 | Dysart et al. ........................... | 395/600 |
| 5,261,052 | 11/1993 | Shimamoto et al. ................... | 395/200 |
| 5,265,221 | 11/1993 | Miller ..................................... | 395/725 |
| 5,276,872 | 1/1994 | Lomet et al. ........................... | 395/600 |
| 5,280,610 | 1/1994 | Travis, Jr. et al. ...................... | 395/600 |
| 5,283,830 | 2/1994 | Hinsley et al. .......................... | 380/25 |
| 5,287,453 | 2/1994 | Roberts .................................. | 395/200 |

*Primary Examiner*—Thomas G. Black
*Assistant Examiner*—Frantz Coby
*Attorney, Agent, or Firm*—Mark S. Walker

[57] ABSTRACT

A system, method and article of manufacture for automatically inserting transactional recoverability object service in binary classes in an information handling system employing object oriented technology, includes the steps of recognizing a constraint indicating that an object is not recoverable and generating a recoverable version of the object. One alternative for generating a recoverable version of the object includes the step of saving a first state of the object in a stream before execution of any method which might change the state of the object. Another alternative for the generating step includes the steps of creating a persistence synchronous class object, registering the persistence synchronous class object, and executing the persistence synchronous class object.

20 Claims, 4 Drawing Sheets

U.S. PATENT DOCUMENTS

| | | | |
|---|---|---|---|
| 5,291,283 | 3/1994 | Kondo et al. | 348/390 |
| 5,295,256 | 3/1994 | Bapat | 395/500 |
| 5,297,279 | 3/1994 | Bannon et al. | 395/600 |
| 5,297,283 | 3/1994 | Kelly, Jr. et al. | 395/650 |
| 5,301,286 | 4/1994 | Rajani | 395/400 |
| 5,301,316 | 4/1994 | Hamilton et al. | 395/600 |
| 5,303,375 | 4/1994 | Collins et al. | 395/650 |
| 5,321,841 | 6/1994 | East et al. | 395/725 |
| 5,325,524 | 6/1994 | Black et al. | 395/600 |
| 5,335,323 | 8/1994 | Kolnick | 395/164 |
| 5,341,478 | 8/1994 | Travis, Jr. et al. | 395/200 |
| 5,343,554 | 8/1994 | Koza et al. | 395/13 |
| 5,363,313 | 11/1994 | Lee | 364/491 |
| 5,369,702 | 11/1994 | Shanton | 380/4 |
| 5,369,778 | 11/1994 | San Soucie et al. | 395/800 |
| 5,375,227 | 12/1994 | Akatsu et al. | 395/575 |
| 5,379,432 | 1/1995 | Orton et al. | 395/700 |
| 5,404,506 | 4/1995 | Fujisawa et al. | 395/600 |
| 5,404,508 | 4/1995 | Konrad et al. | 707/204 |
| 5,404,529 | 4/1995 | Chernikoff et al. | 395/700 |
| 5,408,649 | 4/1995 | Beshears et al. | 395/575 |
| 5,412,774 | 5/1995 | Agrawal et al. | 395/157 |
| 5,414,840 | 5/1995 | Rengarajan et al. | 707/204 |
| 5,421,012 | 5/1995 | Khoyi et al. | 395/650 |
| 5,421,015 | 5/1995 | Khoyi et al. | 395/650 |
| 5,437,027 | 7/1995 | Bannon et al. | 395/600 |
| 5,446,884 | 8/1995 | Schwendemann et al. | 707/204 |
| 5,469,562 | 11/1995 | Saether | 395/182.18 |
| 5,481,699 | 1/1996 | Saether | 395/182.13 |
| 5,493,680 | 2/1996 | Danforth | 395/700 |
| 5,504,883 | 4/1996 | Coverston et al. | 707/204 |
| 5,515,502 | 5/1996 | Wood | 395/182.13 |
| 5,530,855 | 6/1996 | Satoh et al. | 707/204 |
| 5,600,796 | 2/1997 | Okamura et al. | 395/200.11 |
| 5,708,776 | 1/1998 | Kikinis | 395/185.08 |

FIG. 5 ered, if necessary, are stored; a current version page
SYSTEM, METHOD, AND ARTICLE OF MANUFACTURE FOR ADDING TRANSACTIONAL RECOVERY TO A BINARY CLASS IN AN OBJECT ORIENTED SYSTEM

TECHNICAL FIELD OF THE INVENTION

The present invention relates to information handling systems, methods and articles of manufacture, and more particularly to information handling systems and methods for facilitating code reuse in an object oriented system.

BACKGROUND OF THE INVENTION

There is a need to automatically add various forms of transactional recoverability to a binary class. Sometimes the source code is not available to modify the class. Even when source code is available, a great deal of reprogramming is required to add these features.

The user should be able to add this feature in a way that does not increase the size of the user's class diagram with many variations on the original class.

The user should be able to specify this feature as constraints along with constraints that describe the function of the class (e.g., a speaker driver that can go to less than 10 CPS and costs less than $5) when searching for the class. This feature should include whether the object is persistent, whether its persistence can be controlled by the object's clients, how it is faulted into memory, and how it is synced with its datastore.

PRIOR ART.

In the prior art there are many techniques for improving object oriented programming systems (OOPS).

The following are examples of the prior art.

U.S. Pat. No. 5,043,871 entitled "Method and Apparatus for Database Update/Recovery" teaches a backup version page table in a storage for providing a correspondence between the pages of a database and the slots in a database storage medium in which the contents of pages to be recovered, if necessary, are stored; a current version page table for providing a correspondence between pages updated by a transaction and slots in the database storage medium wherein the updated contents of the pages are stored; a journal file for recording various system journals wherein the updated page contents are stored in the database storage medium at the slots not-used at that time and found with reference to the backup version page table and the current version page table.

Although the patent teaches a method and apparatus for recovery in a database, the patent does not teach nor suggest the present invention as taught and claimed herein with respect to automatically adding transactional recovery to a binary class.

U.S. Pat. No. 5,404,508 entitled "Database Backup and Recovery System and Method" teaches a system and method for maintaining a backup database. An initial backup copy of a database is made and stored separate from an active primary database. Each time the primary database is updated, audit information pertaining to the data update is stored in a non-volatile storage. A recovery processor continually reads the audit information from the non-volatile storage and updates the backup database accordingly, thereby maintaining a backup database which is nearly up to date with the primary database.

Although the patent teaches a method and apparatus for recovery in a database, the patent does not teach nor suggest the present invention as taught and claimed herein with respect to automatically adding transactional recovery to a binary class.

U.S. Pat. No. 5,414,840 entitled "Method and System for Decreasing Recovery Time for Failed Atomic Transactions by Keeping Copies of Altered Control Structures in Main Memory" teaches a fast recovery from process terminations during atomic database transaction by maintaining global memory after process terminations. Database data stored in global memory is accessed through control data structures. Control data structures are updated within atomic transactions that maintain structure consistency. Should a process fail during an atomic transaction that is updating control data structures, consistency is maintained by recovering the control data structures to their initial state existing immediately prior to the atomic transaction. Transactions involving control data structures are journaled as before images in a log located in global memory. After a process failure, the before images are installed to return the control data structures to the consistent state existing before the process failure.

Although the patent teaches a method and apparatus for recovery in a database, the patent does not teach nor suggest the present invention as taught and claimed herein with respect to automatically adding transactional recovery to a binary class.

U.S. Pat. No. 5,163,148 teaches a file backup system for producing a backup copy of a file which may be updated during backup. A file header includes a set of flags which synchronize the backup operation. After the backup operation has begun, if a portion of the file being backed up requires updating, the portion of the original file to be updated is maintained in the digital data processing system. The backup control program performing the backup backs up the file, substituting the original portions for portions that have been updated. Since the updated portions of the file are maintained during backup, the file can be accessed and updated while the backup operation is taking place.

Although the patent teaches a method and apparatus for recovery in a database, the patent does not teach nor suggest the present invention as taught and claimed herein with respect to automatically adding transactional recovery to a binary class.

U.S. Pat. No. 5,093,914 generally teaches a method used by a digital computer in controlling execution of an object oriented program to effect a defined action, for example, stopping the program when a specified virtual function is invoked on a specified object during execution of the program.

Although the patent generally deals with methods for controlling execution of object oriented programs, the patent does not teach nor suggest transactional recovery in an object oriented system as is taught and claimed herein with reference with the present invention.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patent deals generally with the use of object oriented systems including classes and sub-classes for solving problems, the patent does not teach nor suggest transactional recovery in an object oriented system as is taught and claimed herein with reference with the present invention.

There is a need to automatically add object services features, for example, persistence, recoverability, concurrency and security to a binary class. A related copending patent application Ser. No. 08/537,648 (AT995-092) teaches and claims automatically inserting object services into binary classes in an object oriented system. Sometimes the source code of a class is not available for modification. Even when the source code is available, a considerable reprogramming effort is required to add the object services features.

A user should be able to add object services features such as transactional recovery in a way that does not increase the size of the user's class diagram with many variations on the original class. The user should be able to specify these object services features as constraints along with constraints that describe the function of the class when searching for the class.

An overall goal in object oriented programming systems is the development of program objects which can be reused easily. The importance of binary code over source code increases with the degree of reuse. For object oriented technology to achieve large scale success, binary code reuse is essential. As the state of the art moves towards applications built from object formats which can be tailored and plugged into each other, binary code is critical.

The Object Management Group is defining a set of interfaces for object system services named Common Object Services.

SUMMARY OF THE INVENTION

It is an object of the present invention to automatically add various forms of transactional recoverability to binary object classes.

Accordingly, a method and system for automatically adding various forms of transactional recoverability to binary classes in an information handling system employing object oriented technology, includes the steps of recognizing a constraint indicating that an object is not recoverable and generating a recoverable version of the object.

One alternative for generating a recoverable version of an object is making a class RecoverableViaStreams. The approach includes the steps of inheriting from the StreamResource class which overrides and provides needed methods, inheriting from the Stream class which provides needed methods, and inheriting from the Recoverable metaclass which provides a set of necessary methods. The method changes are described in the Detailed Description.

Another alternative for generating a recoverable version of an object is making a class RecoverableViaPersistence with Synchronisation. The approach includes the steps of inheriting from the PersistentSynchronisation class which overrides and provides needed methods, inheriting from the RecoverableViaPersistence class which provides needed methods, and inheriting from the Recoverable metaclass which provides a set of necessary methods. The method changes are described in the Detailed Description.

It is an advantage of the present invention that no reprogramming effort is required for automatically adding various forms of transactional recoverability to binary classes, source code is not required and, in fact, is not desired, and the user's class diagram and library do not increase in complexity or size.

DETAILED DESCRIPTION OF A PREFERRED EMBODIMENT OF THE INVENTION

Figure 1:
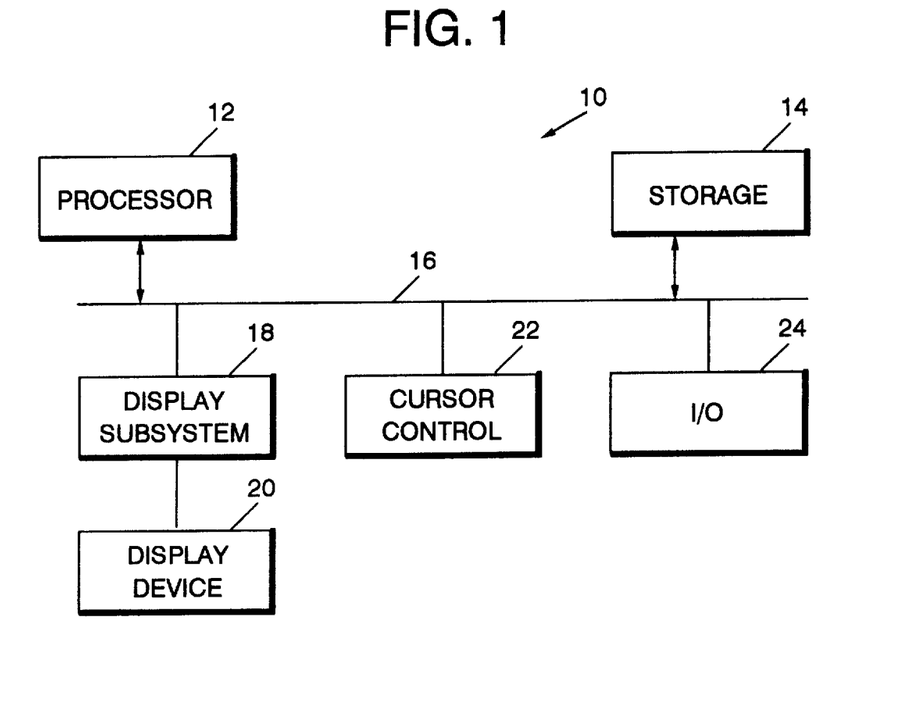
FIG. 1 is a block diagram of a system for executing the method according to the present invention.
Figure 2:
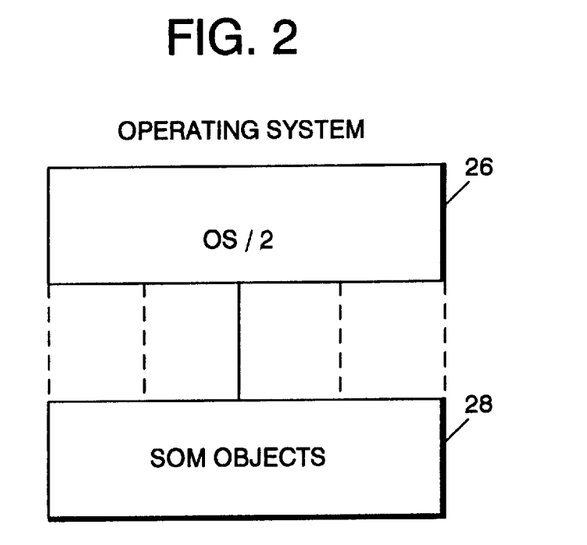
FIG. 2 is a block diagram showing the operating system platform and system object model program supporting the present invention.

Referring now to FIGS. 1 and 2, an information handling system 10 and an operating system environment for the present invention will be described.

Information handling system 10 may be a graphics work station or the like with a very powerful processor 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multitasking operating system such as OS/2* (OS/2 is a registered trademark of International Business Machines Corporation). Among many tasks which the OS/2 operating system controls for operating information handling system 10, is execution of a program SOMObjects, which is a commercially available product of International Business Machines Corporation.

The method and article of manufacture of the present invention may be incorporated in the SOMObjects program.

Figure 3:
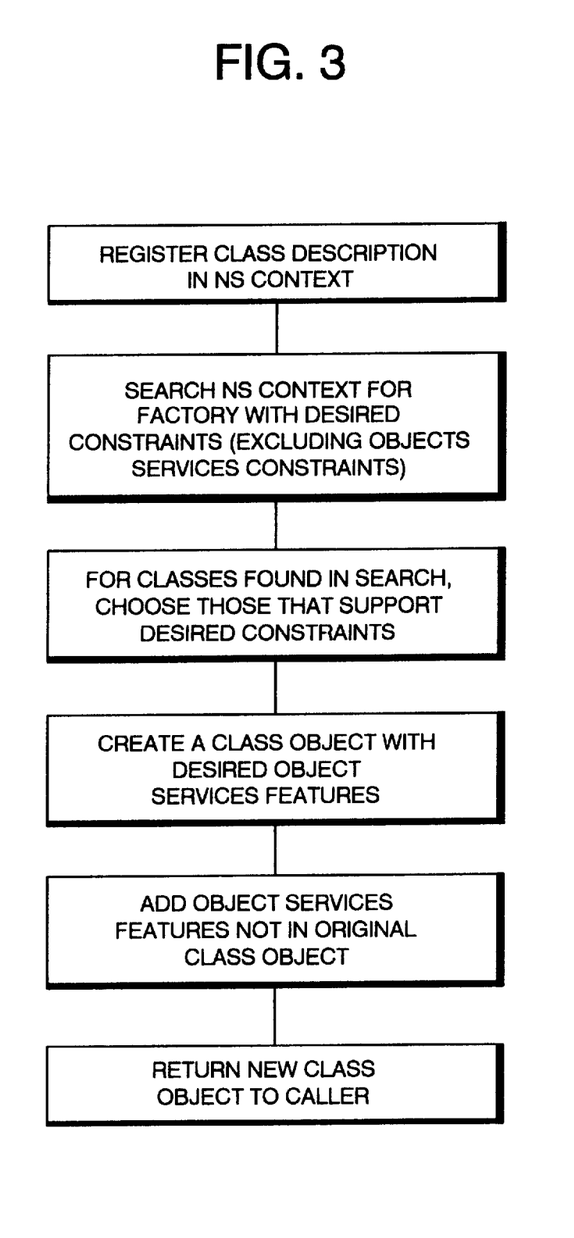
FIG. 3 is a flow chart of the method in accordance with the present invention.

Referring now to FIG. 3, the method according to the present invention will be described.

A class description is registered in a name service (NS) context. This description typically includes a description of the class' function, for example a speaker driver, its characteristics, for example output frequency is 10 CPS, its cost, what object services features are already supported, what processor type it is compiled for, for example Intel X86, and the file name for its load module.

Next, a search is made of the name service context for a factory with the desired constraints on properties, for example a speaker driver that can provide an output to a frequency less than 20 CPS and a cost of less than $5.00. The search would also include a determination of whether the object can run in the machine where the object's InstanceManager lives, for example, Intel X86 binary. Object services constraints such as persistent and recoverable would be excluded from the search.

For classes that are found in the above search, a first selection is made of those classes which already support the object services constraints. Next, a class object is created in a desired server with the desired object services features such as persistent and recoverable. If a particular object services feature is provided in the original class, no action is taken. However, if the feature is not provided, it is added to the new class object.

Lastly, the new class object is returned to the caller who then can use it to create multiple instances of the class.

Many of the object services features can be provided by mixing the original class with the newly created class. Using run time inheritance, the original class' implementation may be overridden by the newly created class. The creation of the new class object with the desired properties can be accomplished in a manner that is transparent to the user.

Object transaction service provides a two-phase commit coordination among recoverable objects, where the transaction service is responsible for passing the transaction context between a caller and a callee, reliably accepting registration of recoverable resources, and coordinating two-phase commitment.

The object consumer requests the object platform to add various object services to the binary class, producing a new class that fits more precisely into the object consumer's application. The enhancements to the binary class to facilitate object services include the following:

Making the object recoverable, so it can participate in a transaction involving multiple recoverable objects coordinated the two-phase commit process of the Transaction Service. This includes registering the object with the transaction manager of the Transaction Service in a before method.

In general, it is expected that the class provider, the entity which provides the abstracted data type referred to herein as a class, will construct the class without concern for object services. When a user wants an instance of a class, the combination of desired services are specified. A new binary class is constructed from the original which adds the desired object services. The description of the technique for inserting object services in a binary class is contained in the above referenced patent application Ser. No. 08/537,648 (AT995-092), which is incorporated by reference herein.

Automatically adding various forms of transactional recoverability to a binary class will be described according to the present invention.

The present invention may be embodied in System Object Model (SOM) (single address space ORB), Distributed System Object Model (DSOM) (across address space ORB), Persistent SOM (PSOM) (persistence framework) and Transactional SOM (TSOM) (transactional framework).

The way the user specifies transactional recoverability is to specify the following constraint when searching for a class object:

name: recoverable value: A boolean indicating whether the object is recoverable, which means that it can participate in transactional two-phase commit.

For a class that is not already recoverable, a recoverable version of that class can be automatically provided. There are two techniques for doing this:

Recoverable Via Streams

Recoverable Via Persistence with Synchronization

Recoverable Via Streams

This technique assumes that all of the object's dynamic state that needs to be recoverable is included in the externalization methods (streamin and streamout). Recovery is accomplished by saving the state of the object in a stream prior to allowing any methods to be executed that might update the object's state. A commit frees the stream. An abort streams the saved state back into the object. Because the object may be involved in multiple transactions at the same time (due to nested transactions), multiple before images must be maintained.

Figure 4:
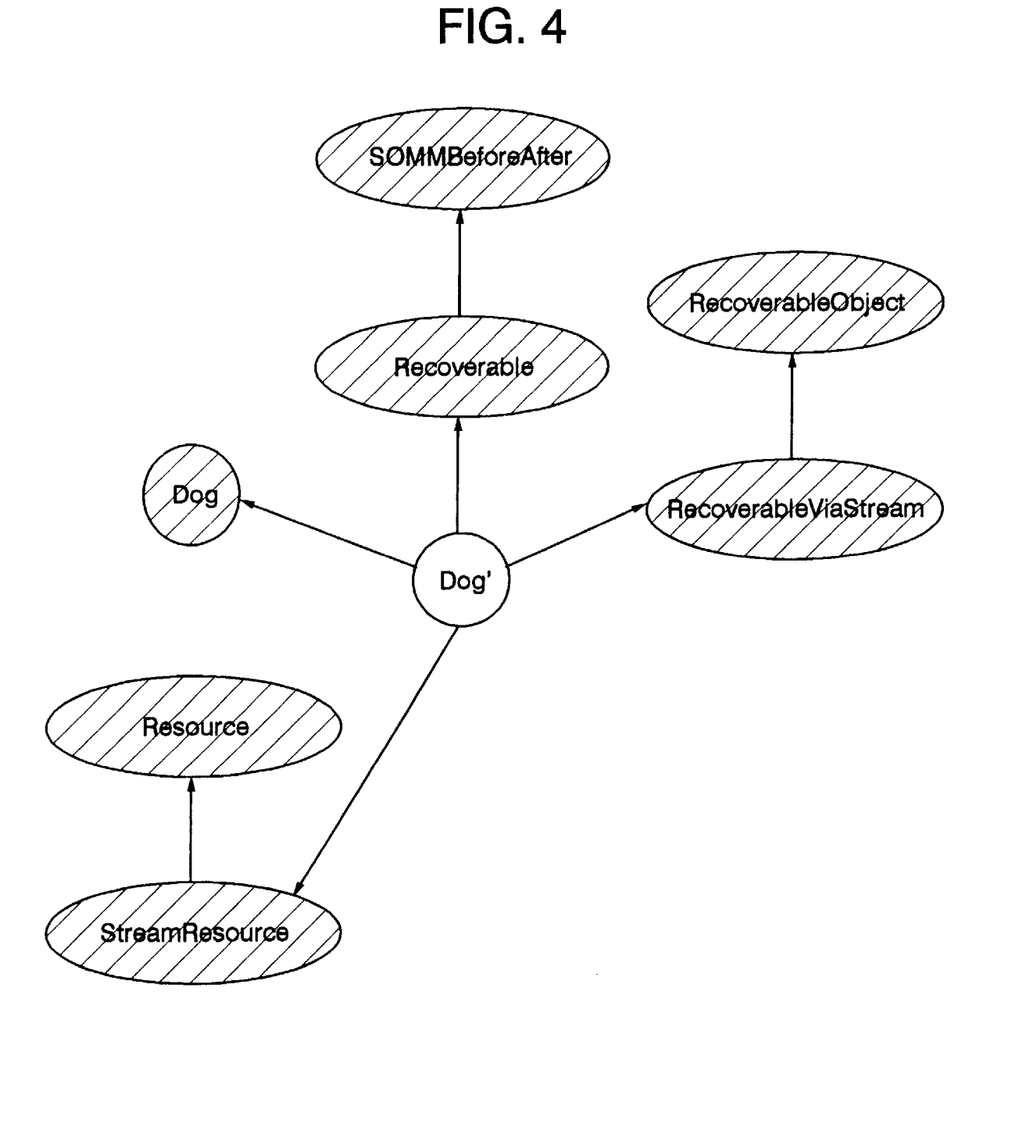
FIG. 4 is an object diagram of the method in accordance with a first embodiment of the present invention.

For a class that was not designed to be recoverable (e.g., Dog), FIG. 4 illustrates how a recoverable version of the class (e.g., Dog') can be constructed using streamin/streamout.

The StreamResource Class. The StreamResource class overrides the prepare, commit, commit_one_phase, rollback, and forget methods of its parent Resource class, the commit_subtransaction and rollback_subtransaction of its parent SubstransactionAwareResource class, and provides an initialize method. It has the following definition:

```
interface StreamResource : SubtransactionAwareResource
{
    void initialize(       in RecoverableViaStream obj,
                           in Coordinator coord);
    implementation
    {
        prepare, commit, commit_one_phase, rollback,
        forget, commit_subtransaction,
        rollback_subtransaction: override;
        Coordinator coord;
        RecoverableViaStream obj;
        Stream before_image;
    };
};
```

The StreamResource::initialize operation sets up the Coordinator and RecoverableViaStream object references and creates a before image of the object. It is implemented as follows:

```
void StreamResource::initialize(  RecoverableViaStream obj,
                                  Coordinator coord)
{
    _coord = coord;
    _obj = obj;
    _before_image - StreamNew();
    obj->streamout(_before_image);
};
```

The StreamResource::prepare and forget operations do nothing. The StreamResource::commit and commit_one_phase operations tell the RecoverableViaStream object that it is no longer involved in the transaction. They are implemented as follows:

```
void StreamResource::commit() // or commit_one_phase
{
    _obj->completed(_coord);
};
```

The StreamResource::rollback and rollback_subtransaction operations restore the state of the RecoverableViaStream object from the before image stream, then tell it that it is no longer involved in the transaction. They are implemented as follows:

```
void StreamResource::rollback() // or rollback_subtransaction
{
    _obj->streamin(_before_image);
    _obj->completed(_coord);
};
```

The StreamResource::commit_subtransaction operation moves the before image to the parent transaction, then tells the RecoverableViaStream object that the child transaction has completed. It is implemented as follows:

```
void StreamResource::commit_subtransaction(Coordinator parent)
{
    Coordinator child = _coord;
    _coord = parent;
    _obj->subtran_completed(child,somSelf,parent);
};
```

The RecoverableObject Class. The RecoverableObject class is a base class that provides the operations to record those transactions in which it is involved, and performing actions when transactions complete or when a subtransaction commits. It has the following definition:

```
interface RecoverableObject
    {
    void involve (in Coordinator coord);
    void completed(in Coordinator coord);
    void subtran_completed(in Coordinator child,
            in SubtransactionAwareResource resource,
            in Coordinator parent);
    implementation
        {
        attribute sequence<Coordinator> registered;
        };
    };
```

The RecoverableViaStream Class. The RecoverableViaStream class is a RecoverableObject that provides the operations that record those transactions in which it is involved, is responsible for creating a StreamResource object and registering it with the Coordinator when the object is first involved in a transaction, and for moving StreamResource objects to parent transactions when subtransactions commit. It has the following definition:

```
interface RecoverableViaStream : RecoverableObject
    {
    implementation
        {
        involve: override;
        completed: override;
        subtran_completed: override;
        };
    }
```

The RecoverableViaStream::involve operation is responsible for involving the object in a transaction if it has not already done so. In order to involve the object in a transaction the RecoverableViaStream::involve operation creates a StreamResource object and registers it with the Coordinator. The operation is implemented as follows:

```
void RecoverableViaStream::involve(Coordinator coord)
    {
    StreamResource sr;
    if(coord in registered) return;
    sr = StreamResourceNew();
    sr->initialize (somSelf,coord);
    if(coord->is_top_level_transaction())
        coord->register_resource (sr);
    else
        coord->register_subtran_aware(sr);
    add coord to registered;
    };
```

The RecoverableViaStream::completed operation removes the given Coordinator from those for which the object has registered. It is implemented as follows:

```
void RecoverableViaStream::completed(Coordinator coord)
    {
    remove coord from registered;
    };
```

The RecoverableViaStream::subtran_completed operation removes the given child Coordinator from those for which the object has registered. If the given parent Coordinator is not among those that have registered, the Stream-Resource is registered with the parent. It is implemented as follows:

```
void RecoverableViaStream::subtran_completed(Coordinator child,
                                SubtransactionAwareResource sr,
                                Coordinator parent)
    {
    remove child from registered;
    if(parent in registered) return;
    if(parent->is_top_level_transaction())
        parent->register_resource(sr);
    else
        parent->register_subtran_aware(sr);
    add parent to registered;
    };
```

The Recoverable Metaclass. The Recoverable metaclass adds the following before method to all methods of Dog (the class that is not already recoverable) to get the methods of Dog' (the class that is recoverable). For methods introduced by the RecoverableObject class, we do nothing. For other methods, we check for a current transaction, and if there is one, involve ourselves in it.

```
void Recoverable::BeforeMethod()
    {
    Control control;
    Coordinator coord;
    switch(method name)
        {
        case involve:
        case completed:
        case subtran_completed:
        case _get_registered:
        case _set_registered:
            //      do nothing for RecoverableObject methods
                    break;
        default: // Dog methods
            control = txn_crt->get_control();
            if(NoTransaction) return;
            coord = control->get_coordinator ();
            somSelf->involve (coord);
        }
    };
```

Recoverable Via Persistence with Synchronization

This technique assumes that the object is recoverable and the datastore is recoverable, that all of the object's recoverable dynamic state that needs to be recoverable is included in the persistent state, and, if nested transactions are used, that the data store supports nested transactions. An abort restores the object from its persistent state in the datastore.

Figure 5:
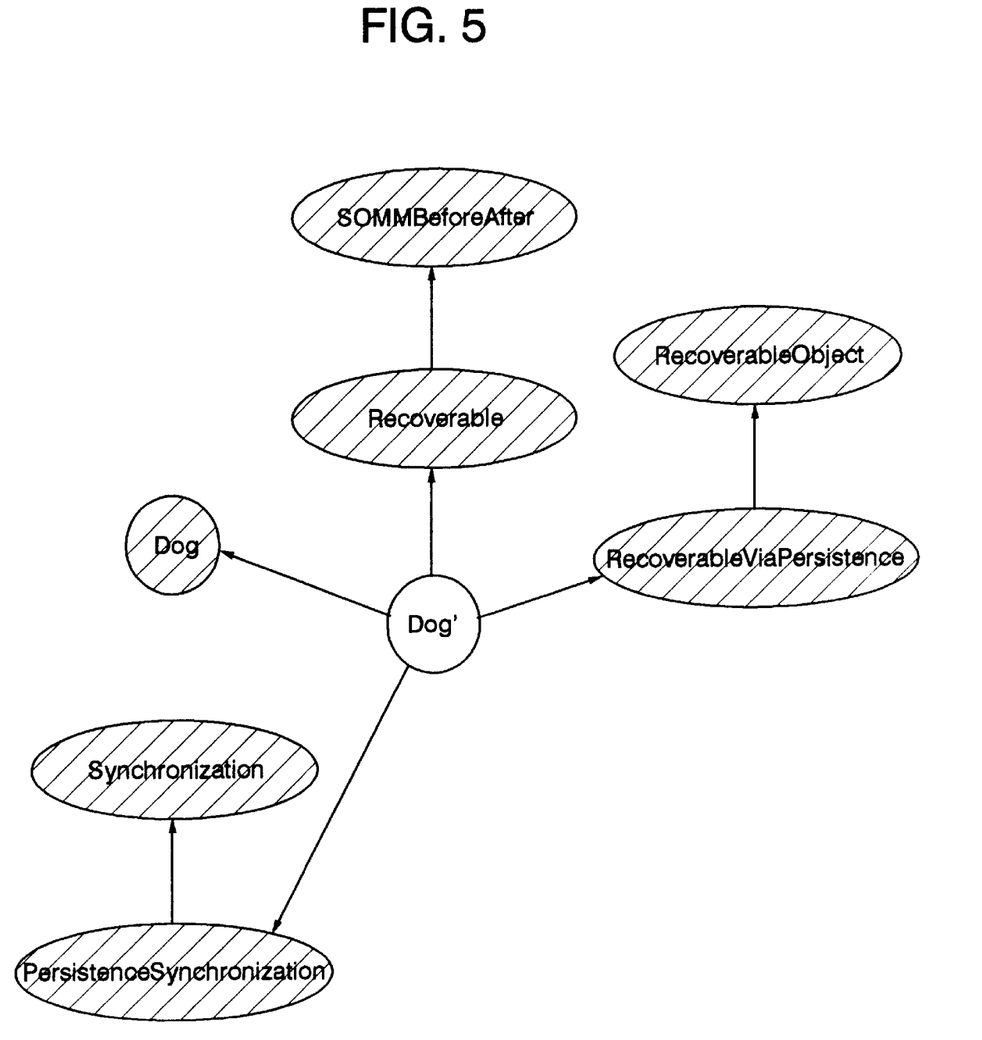
FIG. 5 is an object diagram of the method in accordance with a second embodiment of the present invention.

For a class that was not designed to be recoverable (e.g., Dog), FIG. 5 illustrates how a recoverable version of the class (e.g., Dog') can be constructed using persistence.

The PersistenceSynchronisation Class. The PersistentSynchronisation class overrides the before_completion and after_completion methods of its parent Synchronization class and provides an initialize method. It has the following definition:

```
interface PersistenceSynchronisation : Synchronization
    {
    void initialize (in RecoverableViaPersistence obj);
    implementation
        {
        before_completion, after_completion: override;
        RecoverableViaPersistence obj;
```

The PersistenceSynchronisation::initialize operation sets up the reference to the RecoverableViaPersistence object so that it can be contacted when the object needs to store or restore its state. No before image is created as we assume the data store will do this for us. The operation is implemented as follows:

```
void PersistenceSynchronisation::initialize
                    (RecoverableViaPersistence obj)
    {
    _obj = obj;
    };
```

The PersistenceSynchronisation::before_completion operation stores the persistent state of the object to ensure that the Data Store is updated before the transaction completes. It is implemented as follows:

```
void PersistenceSynchronisation::before_completion()
    {
    PID pid;
    if(PO && _obj->get_pid() !=NULL)
        pid = _obj->get_pid();        // PO's attribute pid
    else
        pid = _get_PID();              // ORB's pid
    _POM->store(_obj,pid);
    {;
```

The PersistenceSynchronisation::after_completion operation restores the state of the RecoverableViaPersistence object from data store in the event that the transaction rolled back, as the Data Store would otherwise be out of sync with the object. It then tells the object that it is no longer involved in the transaction. It is implemented as follows:

```
void PersistenceSynchronisation::after_completion(boolean abort)
    {
    if(abort)
        {
        if(PO && _obj->get_pid() !=NULL)
            pid = _obj->get_pid();    // PO's attribute pid
        else
            pid - _get_pid();          // ORB's pid
        _POM->restore(_obj,pid);
        }
    _obj->completed(_coord);
    };
```

The RecoverableViaPersistence Class. The RecoverableViaPersistence class provides the operations that record those transactions in which it is involved, is responsible for creating a PersistenceSynchronisation object and registering it with the Coordinator when the object is first involved in a top-level transaction. It has the following definition:

```
interface RecoverableViaPersistence : RecoverableObject
    {
    implementation
        {
        involve: override;
        completed: override;
```

```
        };
    };
```

The RecoverableViaPersistence::involve operation is responsible for involving the object in synchronization for a transaction if it has not already done so. In order to involve the object in synchronization for a transaction, the RecoverableViaPersistence::involve operation creates a PersistenceSynchronisation object and registers it for synchronization with the Coordinator. The operation is implemented as follows:

```
void RecoverableViaPersistence::involve(Coordinator coord)
    {
    PersistenceSynchronisation ps;
    if(coord in registered) return;
    ps = PersistenceSynchronisationNew();
    ps->initialize(somSelf);
    coord->register_synchronization(ps);
    add coord to registered;
    };
```

The RecoverablePersistence::completed operation removes the given Coordinator from those for which the object has registered. It is implemented as follows:

```
void RecoverableViaPersistence::completed(Coordinator coord)
    {
    remove coord from registered;
    };
```

The same Recoverable metaclass is used for both scenarios, as it only depends on the operation names and intended behavior of the Recoverableobject class. This metaclass is described in the RecoverableViaStreams detailed description in this patent.

It will be appreciated that although a specific embodiment of the present invention has been described herein for the purposes of illustration, various modifications may be made without departing from the spirit or scope of the invention. Accordingly, the scope of this invention is limited only by the following claims and their equivalents.

What is claimed is:

1. A method, in an information handling system comprising the steps of:

testing a constraint indicating whether or not an object in an object oriented programming system is recoverable; and generating automatically a recoverable version of the object if said object is not recoverable, by adding a "before" method to each method of said object, said "before" method causing invocation of recoverable object services.

2. The method according to claim 1, wherein said recoverable object services include the step of:

saving a first state of the object in a stream before execution of any method which might change the state of the object.

3. The method according to claim 2, wherein said recoverable object services further comprises the step of:

executing an abort operation which streams the first state of the object into the object to recover the first state.

4. The method according to claim 2, wherein said recoverable object services further comprises the step of:

saving a plurality of instances of the first state of the object in one or more streams before execution of any method which might change the state of the object.

5. The method according to claim 2, wherein said recoverable object services further comprises the steps of:
   executing a stream resource object;
   executing a recoverable by stream object; and
   executing a recoverable object class on the object.

6. The method according to claim 1, wherein said recoverable object services further comprises the step of:
   executing a recoverable metaclass object.

7. The method according to claim 1, wherein said recoverable object services include the steps of:
   creating a persistence synchronous class object;
   registering the persistence synchronous class object; and
   executing the persistence synchronous class object.

8. The method according to claim 7, wherein said creating step further comprises the steps of:
   overriding a before and after method of a parent class; and
   executing an initialize method on a recoverable by persistence object.

9. A system, in an information handling system comprising:
   means for testing a constraint indicating whether or not an object in an object oriented programming system is recoverable; and
   means for generating automatically a recoverable version of the object if said object is not recoverable, by adding a "before" method to each method of said object, said "before" method causing invocation of recoverable object services.

10. The system according to claim 9, wherein said recoverable object services includes further comprising:
    means for saving a first state of the object in a stream before execution of any method which might change the state of the object.

11. The system according to claim 10, said recoverable object services further comprising:
    means for executing an abort operation which streams the first state of the object into the object to recover the first state.

12. The system according to claim 10, said recoverable object services further comprising:
    means for saving a plurality of instances of the first state of the object in one or more streams before execution of any method which might change the state of the object.

13. The system according to claim 10, said recoverable object services further comprising:
    means for executing a stream resource object;
    means for executing a recoverable by stream object; and
    means for executing a recoverable object class on the object.

14. The system according to claim 9, said recoverable object services further comprising:
    means for executing a recoverable metaclass object.

15. The system according to claim 9, wherein the recoverable object services further comprises:
    means for creating a persistence synchronous class object;
    means for registering the persistence synchronous class object; and
    means for executing the persistence synchronous class object.

16. The system according to claim 15, wherein said means for creating further comprises:
    means for overriding a before and after method of a parent class; and
    means for executing an initialize method on a recoverable by persistence object.

17. A computer readable medium in an information handling system having program logic recorded thereon for causing said information handling system to generate a recoverable object the computer readable medium comprising:
    computer readable program logic means for testing a constraint indicating whether or not an object in an object oriented programming system is recoverable; and
    computer readable program logic means for generating automatically a recoverable version of the object if said object is not recoverable, by adding a "before" method to each method of said object, said "before" method causing invocation of recoverable object services.

18. The computer readable medium, according to claim 17, wherein said recoverable object services includes:
    computer readable program logic means for saving a first state of the object in a stream before execution of any method which might change the state of the object.

19. The computer readable medium, according to claim 17, said recoverable object services further comprising:
    computer readable program logic means for executing an abort operation which streams the first state of the object into the object to recover the first state.

20. The computer readable medium, according to claim 17, said recoverable object services further comprising:
    computer readable program logic means for creating a persistence synchronous class object;
    computer readable program logic means for registering the persistence synchronous class object; and
    computer readable program logic means for executing the persistence synchronous class object.

* * * * *